(12) United States Patent
Stiesdal

(10) Patent No.: US 9,249,597 B2
(45) Date of Patent: Feb. 2, 2016

(54) TOWER CONSTRUCTION

(75) Inventor: Henrik Stiesdal, Odense C (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 111 days.

(21) Appl. No.: 13/808,727

(22) PCT Filed: Nov. 4, 2010

(86) PCT No.: PCT/EP2010/066812
§ 371 (c)(1),
(2), (4) Date: Jan. 7, 2013

(87) PCT Pub. No.: WO2012/007069
PCT Pub. Date: Jan. 19, 2012

(65) Prior Publication Data
US 2013/0104489 A1    May 2, 2013

(30) Foreign Application Priority Data

Jul. 12, 2010  (EP) ..................................... 10007148

(51) Int. Cl.
*E04H 12/34*   (2006.01)
*E04H 12/08*   (2006.01)
*F03D 1/00*    (2006.01)
*F03D 11/04*   (2006.01)

(52) U.S. Cl.
CPC .............. *E04H 12/34* (2013.01); *E04H 12/085* (2013.01); *F03D 1/001* (2013.01); *F03D 11/04* (2013.01); *F05B 2240/302* (2013.01); *F05B 2240/912* (2013.01); *Y02E 10/721* (2013.01); *Y02E 10/728* (2013.01)

(58) Field of Classification Search
CPC ....... E04H 12/085; E04H 12/34; F03D 11/04; F03D 1/001
USPC ......... 52/651.01, 651.07, 651.09, 655.1, 836, 52/843–845; 416/DIG. 6
See application file for complete search history.

(56) References Cited

U.S. PATENT DOCUMENTS

| | | | |
|---|---|---|---|
| 835,279 A * | 11/1906 | Haskell ...................... | 52/651.02 |
| 1,959,756 A * | 5/1934 | Ferm .............................. | 138/157 |
| 2,091,861 A * | 8/1937 | Junge .............................. | 52/847 |
| 4,248,025 A * | 2/1981 | Kleine et al. .................... | 52/845 |
| 6,094,881 A * | 8/2000 | Lockwood ...................... | 52/845 |
| 6,957,518 B1 * | 10/2005 | Koch, Jr. ......................... | 52/849 |
| 7,160,085 B2 * | 1/2007 | de Roest ................... | 416/244 R |
| 7,841,154 B2 * | 11/2010 | Auman ............................ | 52/848 |
| 7,877,935 B2 * | 2/2011 | Ollgaard .......................... | 52/40 |
| 8,082,719 B2 * | 12/2011 | Bagepalli ........................ | 52/849 |

(Continued)

FOREIGN PATENT DOCUMENTS

| | | |
|---|---|---|
| CN | 101328864 A | 12/2008 |
| JP | 2007120080 A | 5/2007 |

(Continued)

*Primary Examiner* — Charles A Fox
*Assistant Examiner* — Charissa Ahmad

(57) ABSTRACT

A tower construction for a wind turbine is proposed. The tower construction has a number of axially disposed hollow cylindrical tower sections. Each of the axially disposed hollow cylindrical tower sections has a number of circumferentially disposed first tower section segments and a number of circumferentially disposed second tower section segments. The first tower section segments and the second tower section segments are alternated with each other.

15 Claims, 6 Drawing Sheets

(56) References Cited

U.S. PATENT DOCUMENTS

| | | | |
|---|---|---|---|
| 8,209,913 B2* | 7/2012 | Murata | 52/40 |
| 8,250,833 B2* | 8/2012 | Thomsen | 52/845 |
| 8,281,547 B2* | 10/2012 | Hettick | 52/745.17 |
| 8,316,615 B2* | 11/2012 | Haridasu et al. | 52/745.17 |
| 8,590,276 B2* | 11/2013 | Kryger et al. | 52/845 |
| 8,720,161 B2* | 5/2014 | Herrius de Roest | 52/848 |
| 2006/0213145 A1* | 9/2006 | Haller | 52/651.01 |
| 2006/0236648 A1* | 10/2006 | Grundman et al. | 52/726.4 |
| 2007/0294955 A1* | 12/2007 | Sportel | 52/40 |
| 2008/0256892 A1* | 10/2008 | Franke | 52/655.1 |
| 2009/0021019 A1* | 1/2009 | Thomsen | 290/55 |
| 2009/0031639 A1 | 2/2009 | Cortina Cordero | |
| 2010/0313497 A1* | 12/2010 | Jensen | 52/173.1 |
| 2012/0159875 A1* | 6/2012 | Meyer et al. | 52/115 |
| 2012/0210668 A1* | 8/2012 | Kryger et al. | 52/645 |

FOREIGN PATENT DOCUMENTS

| | | |
|---|---|---|
| JP | 2008045395 A | 2/2008 |
| JP | 2008101363 A | 5/2008 |
| WO | WO 2008031912 A1 | 3/2008 |
| WO | WO 2009056898 A1 * | 5/2009 |
| WO | WO 2009056969 A2 | 5/2009 |
| WO | WO 2010026098 A2 | 3/2010 |
| WO | WO 2010049313 A2 | 5/2010 |

* cited by examiner

TOWER CONSTRUCTION

CROSS REFERENCE TO RELATED APPLICATIONS

This application is the US National Stage of International Application No. PCT/EP2010/066812 filed Nov. 4, 2010 and claims the benefit thereof. The International Application claims the benefits of European application No. 10007148.9 filed Jul. 12, 2010, both of the applications are incorporated by reference herein in their entirety.

FIELD OF THE INVENTION

The invention relates to a tower construction, particularly for a wind turbine.

BACKGROUND OF THE INVENTION

Tower constructions, particularly for wind turbine towers, are large-scaled constructions regarding diameter and height. Thereby, many different tower constructions for on- and off-shore applications are known differing in their constructive design, that is for example in the type of the connection to the foundation structure, their basic shape, which may be straight, conical or stepwise conical for instance, number and size of respective hollow cylindrical axially aligned tower sections, connecting means, etc.

Particularly in the field of wind energy, the growing interest in renewable energies has resulted in increased dimensions of wind turbines and accordingly, respective tower constructions have also become larger, so that the tower construction nowadays represents a considerable economical factor of the total costs of a wind turbine both regarding material use and makespan. Further, with increased dimensions difficulties may occur regarding manufacture, transport and handling of the components of respective tower constructions.

SUMMARY OF THE INVENTION

Therefore, it is the object of the present invention to provide an improved tower construction, particularly regarding manufacture, transportability and handling.

This is achieved by a tower construction as described above, having a number of axially disposed hollow cylindrical tower sections each comprising a number of circumferentially disposed alternating first and second tower section segments.

The present tower construction consists of a number of axially disposed hollow cylindrical tower sections which essentially define the height and basic shape of the tower construction. Thereby, different shapes are thinkable, that is the tower construction may have an essentially round cross-section for instance, whereby the diameter of the tower construction may decrease with increasing height resulting in a conical shape. Yet, other, particularly polygonal cross-sections, which may taper with increasing height of the tower construction are feasible as well.

Aside to the vertical segmentation of the tower constructions by means of the tower sections, the tower construction is further segmented in circumferential direction since each tower section comprises a number of circumferentially disposed alternating first and second tower section segments which may be deemed as the basic components of the tower construction. In such a manner, the constructive design of the tower construction, that is mainly regarding height and diameter essentially depends on the number and dimensions of the first and second tower section segments defining the radial and axial dimensions of each tower section and hence, according to the number of tower sections the radial and axial dimensions of the tower construction as a whole.

Thus, the inventive tower construction provides a flexible constructive design suitable to many different tower designs which is essentially defined by the number and the dimensions of the first and second tower section segments since the alternative arrangement of first and second tower section segments building tower sections and axially arranging of respective tower sections on top of each other is always the same.

Further, the basic components of the tower construction, that is the first and second tower section segments are comparatively easy to manufacture, transport and handle.

It is preferred, that each tower section is provided with overlapping portions of the respective alternating first and second tower section segments in circumferential direction, whereby the size of the overlapping portions increases in axial direction. This arrangement results in a conical shape of the respective tower sections and the tower construction as a whole. Thereby, a good mechanical stability of the respective connecting portions of the alternatively disposed first and second tower section segments is given, which is mainly defined by the respective circumferentially provided overlapping portions increasing in size in axial upward direction.

Thereby, the respective overlapping portions may be fixed to each other by connecting means, in particular bolted joints and/or welded joints. Of course, other connecting means providing an appropriate and sufficiently stable mechanical joint of the respective circumferentially abutting overlapping portions of the first and second tower section segments are applicable as well.

It is preferred, that the first and second tower section segments have a rectangular shape. This leads to great advantages regarding manufacture, transport and handling of the respective first and second tower section segments since they may be easily cut from respective metal plates, whereby the width of the metal plate may define the width or length respectively of the first or second tower section segment. Likewise, cutting costs and material waste is reduced. Further, the rectangular shape regularly allows a good stackability of the respective first and second tower section segments and the transport with standard transport containers, that is no highly specialised equipment is necessary for transportation resulting in lower transportation costs. In exceptional cases, the first and second tower section segments may comprise trapezoid or other shapes as well.

In a further embodiment of the invention, the first and second tower section segments of a tower section have the same height but different widths. This implies the geometric difference of the first and second tower section segments.

Thereby, it is preferred that the width of the first tower section segments is constant throughout each tower sections and the width of the second tower section segments decreases throughout each tower section. In such a manner, the cross-section or diameter of the axially upward aligned tower sections reduces towards the top of the tower construction resulting in a tapered, conical shape of the tower sections and the entire tower construction. Further, this feature has positive effects regarding the manufacture of the first tower section segments since their dimensions may essentially be constant throughout the whole tower construction, that is the first tower section segments comprise identical or uniform dimensions throughout the tower sections and hence, the entire tower construction leading to a further simplified manufacturing process of the inventive tower construction.

The first tower section segments may be axially connected to further first tower section segments and the second tower section segments may be axially connected to further second tower section segments. Thus, the constructive design of the inventive tower construction consists of alternating first and second tower section segments in circumferential direction and vertically or axially aligned first or second tower section segments, that is first tower section segments are placed on axially abutting further first tower section segments and second tower section segments are placed on axially abutting further second tower section segments. Hence, first and second tower section segments are each placed on top of each other.

It is of advantage, when at least one first and second tower section segment comprises at least one connecting portion for connecting with further first and second tower section segments disposed at a respective axial free ending. The connecting portion provides a safe and firm connection site for axially abutting further first or second tower section segments respectively. This also leads to an eased assembly of adjacently disposed tower sections since the connecting portions may also serve in terms of a support structure which contributes to a proper arrangement of the respective first and second tower section segments on top of each other.

Thereby, it is in favour when at least one connecting portion is disposed at each axial free ending of the respective first and/or second tower section segments. In such a manner, the connectability of axially adjacently disposed first or second tower section segments is further improved since an engagement of corresponding connecting portions is feasible.

Therefore, it is preferred that at least one connecting portion is disposed radially outside and at least one connecting portion is disposed radially inside of the respective first and/or second tower section segment with respect to the tower construction axis. In such a manner, the connecting portions may also serve as a guiding means for a proper attachment of first or second tower section segments to be disposed downstream, thereby defining the correct order of axially connecting first or second tower section segments.

The connecting portions of abutting first or second tower section segments may be connected by means of bolted joints and/or welded joints. Likewise, in exceptional cases other connecting means providing a safe and firm mechanical joint of abutting first or second tower section segments may be thinkable as well.

It is possible, that the connecting portions are pre-mounted to the respective first and/or second tower section segments. Thus, the connecting portions and the respective first or second tower section segments represent a pre-mounted component ready to be connected with further first or second tower section segments respectively, thereby simplifying the erection process of the tower construction. Pre-mounting of the connecting portions may be achieved by a small number of bolts. Of course, the connecting portions may also be integrally built with the respective first or second tower section segments.

The connecting portions are preferably built as a fishplate. Of course, other types of connecting portions such as lugs, butt straps or any other type of plate-like members are thinkable as well. Thereby, the widths of the fishplates may vary or be adapted to the respective overlapping portions of the first and second tower section segments.

In a further preferred embodiment of the invention, at least one first and/or second tower section segment comprises at least one at least partially axially extending bent. The bent is preferably a small angle bent, which is easy to manufacture so that the processing of the respective first or second tower section segment is still fast and easy to accomplish particularly without the need of complex bending tools. Further, the bent does also contribute to the good stackability of the respective first or second tower section segments.

Aside, the invention relates to a wind turbine comprising a tower construction as describes above. Hence, the lower part of the inventive wind turbine, that is the wind turbine tower is provided with a high degree of constructive flexibility as well as advantages concerning manufacture, transport and handling.

BRIEF DESCRIPTION OF THE DRAWINGS

Further advantages and details of the present invention can be taken from the following detailed description of preferred embodiments of the invention as well as the principle drawings, whereby.

DETAILED DESCRIPTION OF THE INVENTION

Figure 1:
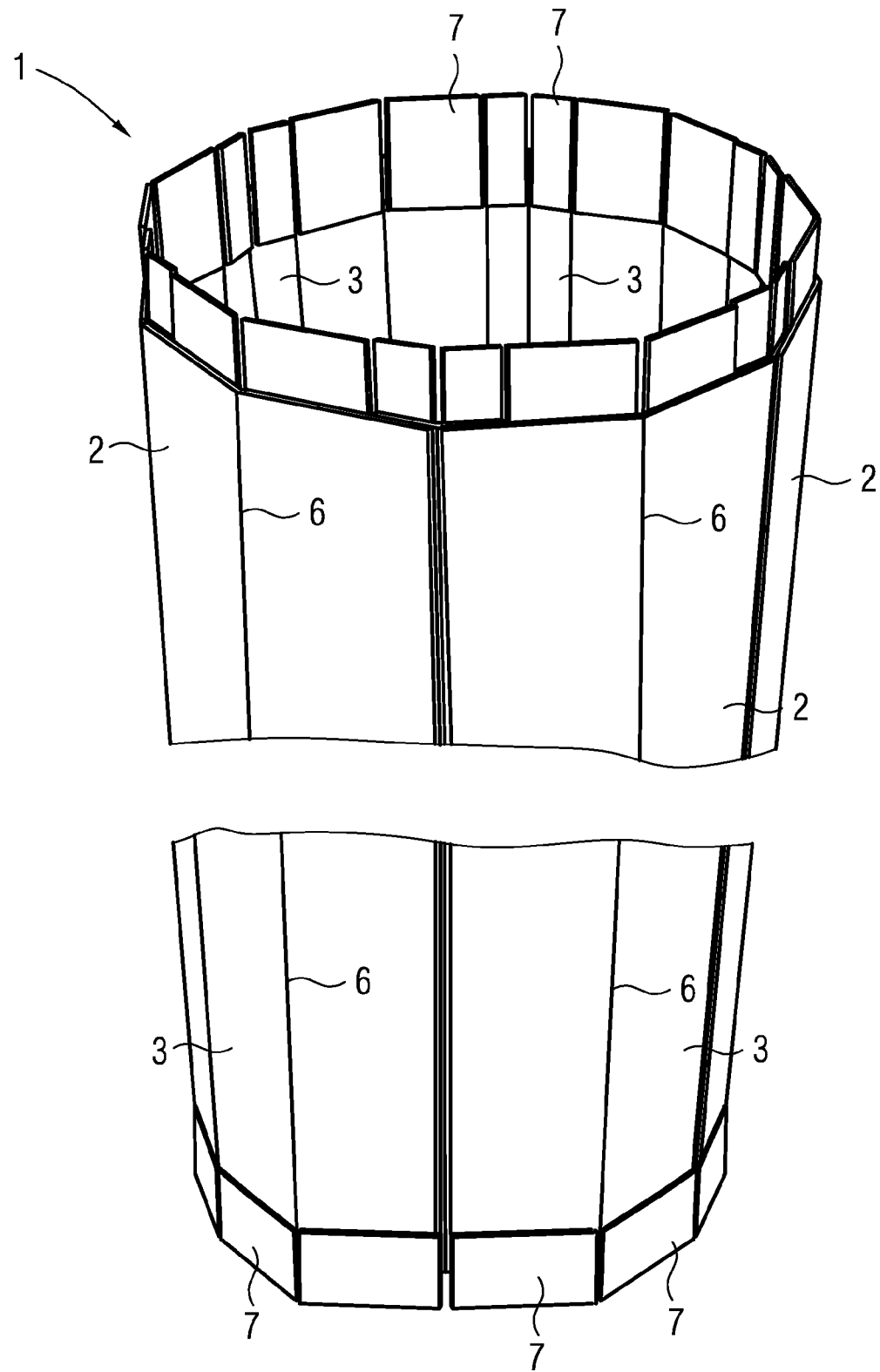
FIG. 1 shows a perspective view of a tower section.

FIG. 1 shows a perspective view of a tower section 1 of a not explicitly shown tower construction of a wind turbine. The hollow cylindrical tower section 1 may be axially coupled to further tower sections 1 in order to erect the tower construction, whereby a typical tower construction may comprise eight axially aligned tower sections 1 for instance. Thereby, in dependence on the diameter or cross-section of the respective tower sections 1, the tower construction may have a straight or conical shape for instance.

The tower section 1 consists of a number of circumferentially disposed first tower section segments 2 and second tower section segments 3 in an alternating arrangement, whereby the first tower section segments 2 have a radially outward and the second tower section segments 3 have a radially inward position relative to the vertical axis of the tower construction. Of course, an opposite arrangement of the first and second tower section segments 2, 3 would be feasible as well.

Figure 5:
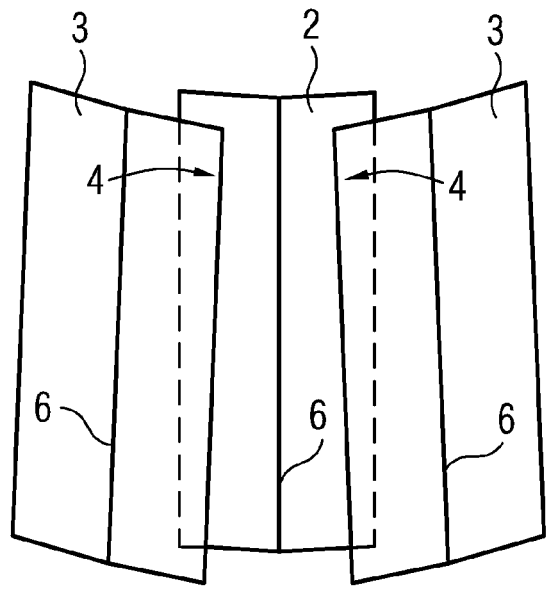
FIG. 5-7 show cut-out views of overlapping portions of first and second tower section segments.
Figure 6:
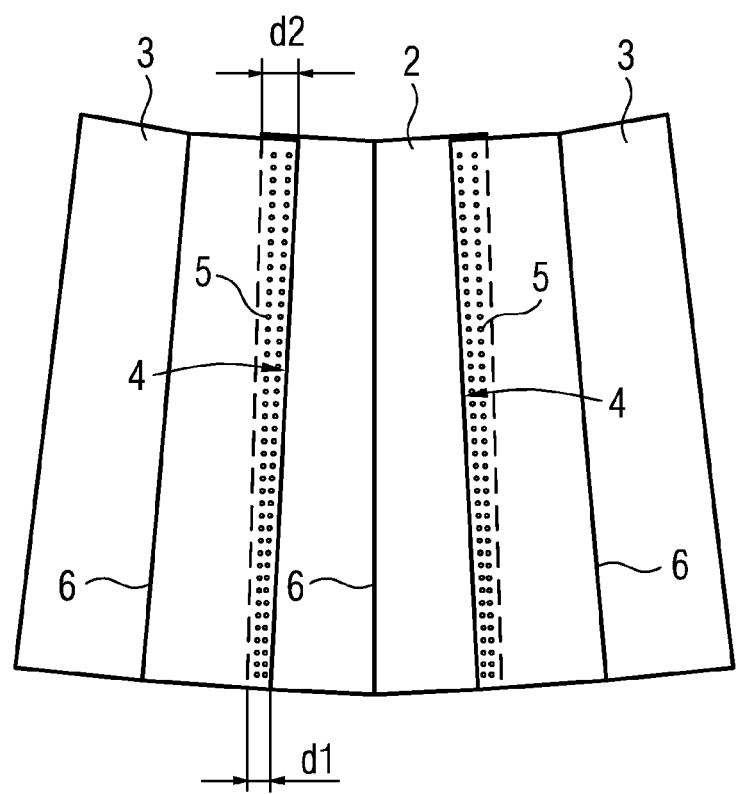
Figure 7:
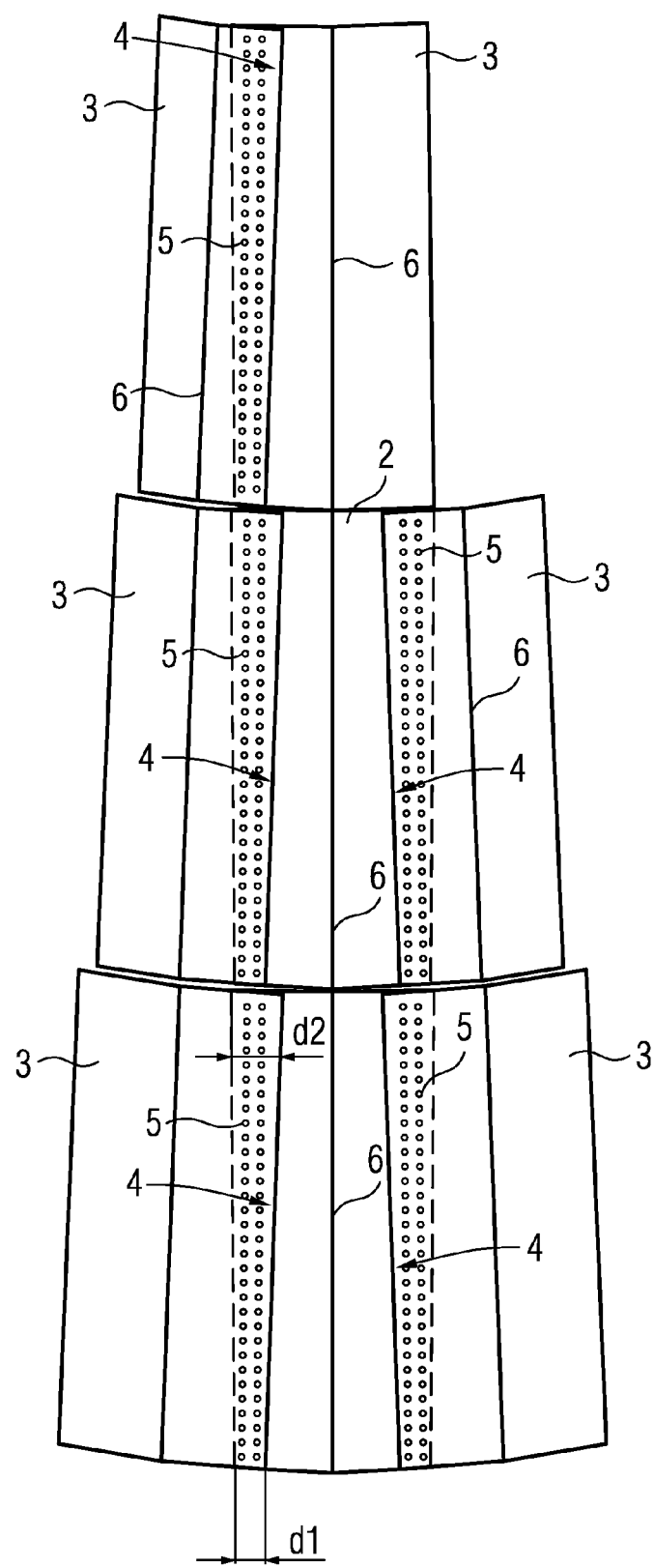
Figure 8:
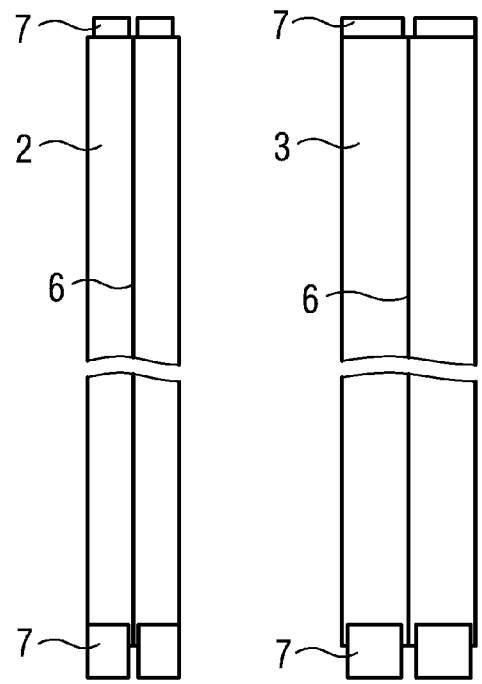
FIG. 8 shows a front-view of a first and a second tower section segment.

The tower section 1 is provided with overlapping portions 4 of the respective alternating rectangular first and second tower section segments 2, 3 in circumferential direction, whereby the size of the overlapping portions 4 increases in axial direction (cf. FIGS. 5-7 depicting that the width $d_1$ of the lower part of the overlapping portion 4 is smaller than the width $d_2$ of the upper part of the overlapping portion 4). A connection of the respective overlapping portions 4 and hence, the alternating first and second tower section segments 2, 3 is provided by means of bolts 5 for instance.

Figure 2:
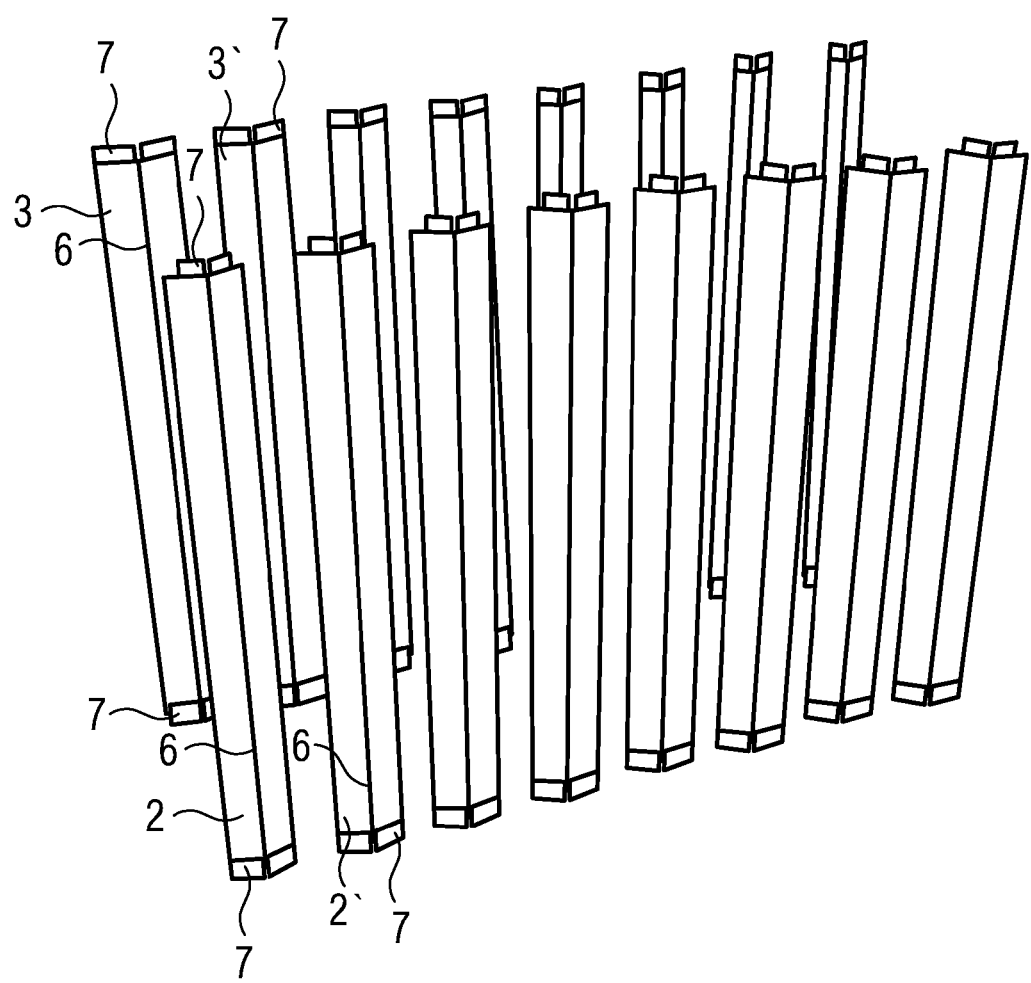
FIG. 2 shows a perspective view of first and second tower section segments.
Figure 3:
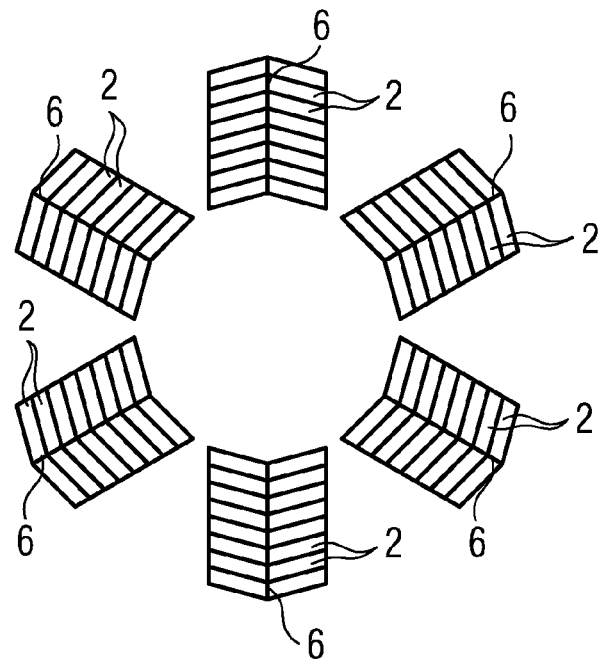
FIG. 3 shows a top-view of first tower section segments.
Figure 4:
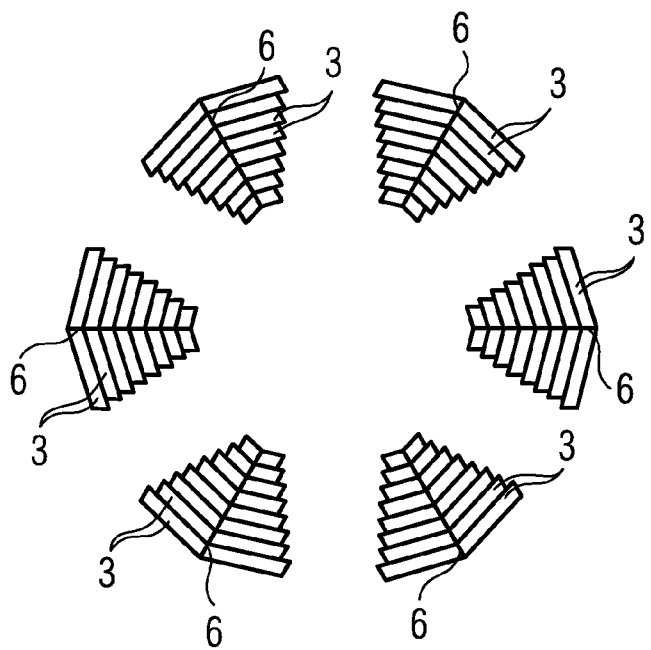
FIG. 4 shows a top-view of second tower section segments.

As is particularly deducible from FIGS. 2-4, the first and second tower section segments 2, 3 have the same height, yet differ in width. Further, the first tower section segments 2 have a uniform shape and essentially the same dimensions throughout the entire tower construction, whereas the second tower section segments 3 become narrower, that is are reduced in width with every tower section 1.

FIG. 2 shows representative first and second tower section segments 2, 3, whereby the first tower section segments 2 are disposed in the front row and the second tower section segments 3 are disposed in the back row. Thereby, eight pairs of first and second tower section segments 2, 3 each being used for a respective tower section 1 of a tower construction, which consequently consists of eight axially disposed tower sections 1 are built from the left to the right. That is, a number of the left first and second tower section segments 2, 3 is used in the bottom tower section and a number of the following first and second tower section segments 2', 3' is used for the following tower section disposed on a subsequent axial higher level, etc.

Both the first and second tower section segments 2, 3, which are preferably made of a high class steel grade, comprise an axially extending low-angle bent 6. Hence, the first and second tower section segment 2, 3 are easy to manufacture and require only a minimum of processing, since they only have to be cut from a metal plate in order to obtain their basic shape and further be provided with bores or holes for respective connecting means, that is mainly bolts, as well as be provided with the bent 6.

As is particularly deducible from FIG. 7, the first tower section segments 2 are axially connected to further first tower section segments 2 and the second tower section segments 3 are axially connected to further second tower section segments 3. Thereby, the axial free endings of the respective first and/or second tower section segments 2, 3 comprise connecting portions in the shape of fishplates 7. The fishplates 7 may be pre-mounted components, whereby pre-mounting may be accomplished by a number of small bolts or the like. The upper fishplates 7 are disposed radially inside and the lower fishplates 7 are disposed radially outside of the respective first and/or second tower section segments 2, 3 with respect to the tower construction axis. Of course, an opposite arrangement of the fishplates 7 is applicable as well.

Figure 9:
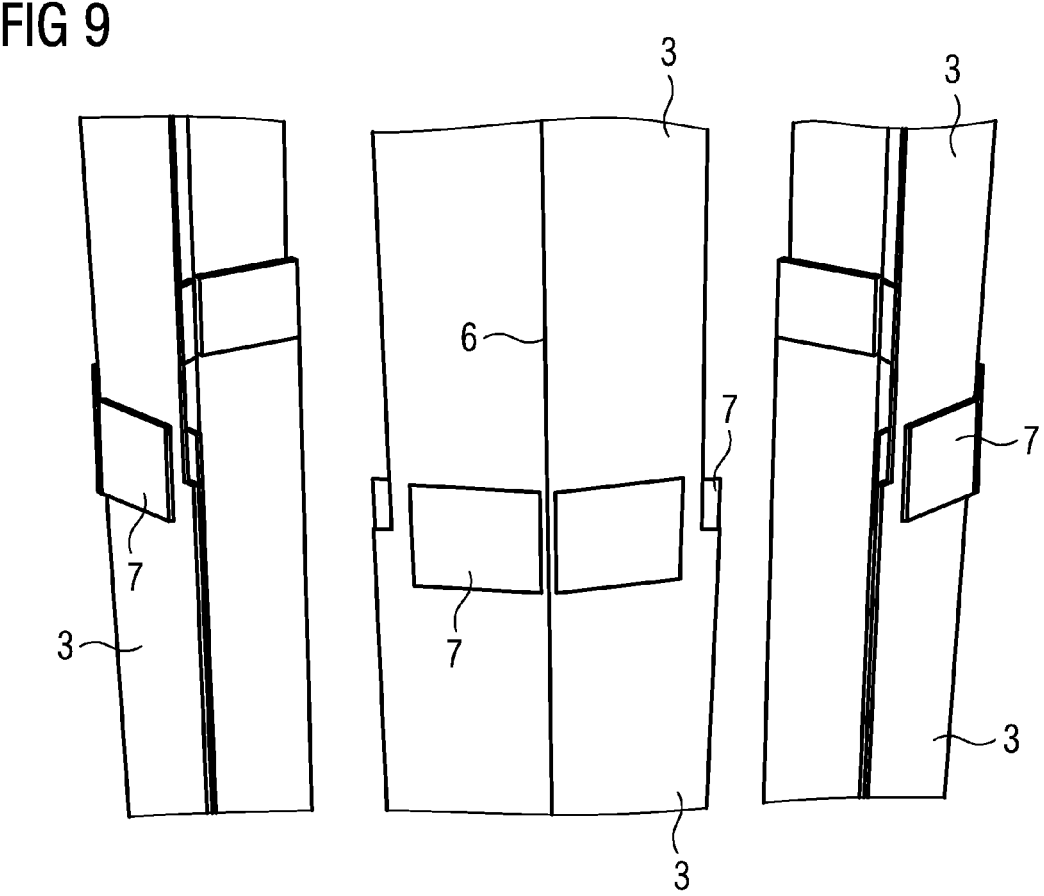
FIG. 9 shows an exploded view of axial arrangement of second tower section segments.

Since the size of the overlapping portions 4 of the respective first and second tower section segments 2, 3 is not uniform, but increases in axial direction, the dimensions, that is mainly the widths of the fishplates 7 is preferably adapted thereto (cf. FIG. 9). Thus, the axially upper fishplates 7 may have a reduced width allowing that the respective first or second tower section segments 2, 3 may overlap to an extent where the fishplates 7 abut each other.

FIG. 9 shows the axial arrangement of respective second tower section segments 3 in an exploded view, whereby the respective corresponding radially outer and inner fishplates 7 serve in terms of a support abutting the respective outer or inner surfaces of the second tower section segments 3 in the region of the axial free endings. In other words, the fishplates 7 partially overlap the respective free axial endings of the second tower section segments 3, that is they may engage. Bolts (not shown) are used in order to provide a safe and mechanically stable connection. The same applies to the axial connection of respective first tower section segments 2.

Regarding exemplary dimensions of the first tower section segments 2, typical widths may be ca. 1250 mm. The second tower section segments 3 may have a width of ca. 1500 mm at a lower tower section 1 and may be reduced in width by ca. 150 mm for each following tower section 1 for instance. The height of the first and second tower section segments 2, 3 may be ca. 12000 mm for instance, that is they easily fit in a standard transport container. The inventive tower may have a diameter of ca. 5000 mm at the bottom and ca. 2500 mm at the top.

The invention claimed is:

1. A tower construction for a wind turbine, comprising:
a plurality of axially disposed hollow cylindrical tower sections,
wherein each of the tower sections comprises an upper end and a lower end, and comprises a plurality of circumferentially disposed alternating first and second tower section segments defining an overlapping portion having a width and extending axially between the upper and lower end; and
wherein the width of the overlapping portions of each tower sections increases in an upward axial direction resulting in the overlapping portion at the lower end of one tower section having a width less than the overlapping portion at the upper end of an adjoined tower section.

2. The tower construction according to claim 1, wherein the overlapping portions are fixed to each other by a connecting device.

3. The tower construction according to claim 2, wherein the connecting device comprises bolted joints and/or welded joints.

4. The tower construction according to claim 1, wherein the first and the second tower section segments comprise a rectangular shape respectively.

5. The tower construction according to claim 1, wherein the first and the second tower section segments comprise same heights and different widths.

6. The tower construction according to claim 1, wherein the first tower section segments comprise widths that are constant throughout each of the tower sections, and wherein the second tower section segments comprise widths that differ throughout each of the tower sections.

7. The tower construction according to claim 1, wherein one of the first tower section segments is axially connected to a further one of the first tower section segments, and wherein one of the second tower section segments is axially connected to a further one of the second tower section segments.

8. The tower construction according to claim 1, wherein at least one of the first tower section segments comprises a first connecting portion for connecting with a further one of the first tower section segments disposed at a first axial free ending, and wherein at least one of the second tower section segments comprises a second connecting portion for connecting with a further one of the second tower section segments disposed at a second axial free ending.

9. The tower construction according to claim 8, wherein the first connecting portion is disposed at the first axial free ending of the first tower section segments, and wherein the second connecting portion is disposed at the second axial free ending of the second tower section segments.

10. The tower construction according to claim 9, wherein the first and the second connecting portions are disposed radially outside of the first and the second tower section segments with respect to an axis of the tower construction respectively, and wherein a further first and a further second connecting portions are disposed radially inside of the first and the second tower section segments with respect to the axis of the tower construction respectively.

11. The tower construction according to claim 8, wherein the first and the second connecting portions abut the first and the second tower section segments by bolted and/or welded joints respectively.

12. The tower construction according to claim 8, wherein the first and the second connecting portions are pre-mounted to the first and the second tower section segments respectively.

13. The tower construction according to claim 8, wherein the first and the second connecting portions are built as a fishplate respectively.

14. The tower construction according to claim 1, wherein at least one of the first tower section segments and/or at least one of the second tower section segments comprises at least one at least partially axially extending bent.

15. A wind turbine, comprising:
a tower construction according to claim 1.

* * * * *